United States Patent
Kurahashi et al.

(10) Patent No.: US 8,564,686 B2
(45) Date of Patent: Oct. 22, 2013

(54) IMAGING APPARATUS, IMAGING APPARATUS BODY, AND SHADING CORRECTING METHOD

(71) Applicant: FUJIFILM Corporation, Tokyo (JP)

(72) Inventors: Hidekazu Kurahashi, Saitama (JP); Ryou Hasegawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/651,960

(22) Filed: Oct. 15, 2012

(65) Prior Publication Data

US 2013/0038751 A1 Feb. 14, 2013

Related U.S. Application Data

(63) Continuation of application No. PCT/JP2011/078389, filed on Dec. 8, 2011.

(30) Foreign Application Priority Data

Feb. 15, 2011 (JP) ................. 2011-029854

(51) Int. Cl.
*H04N 5/228* (2006.01)
*H04N 9/73* (2006.01)
*H04N 5/232* (2006.01)

(52) U.S. Cl.
USPC ...................... 348/222.1; 348/224.1; 348/345

(58) Field of Classification Search
None
See application file for complete search history.

(56) References Cited

U.S. PATENT DOCUMENTS

| 2006/0147200 | A1* | 7/2006 | Arimoto et al. | 396/529 |
| 2008/0204574 | A1* | 8/2008 | Kyung | 348/229.1 |
| 2009/0316020 | A1* | 12/2009 | Ezawa et al. | 348/226.1 |
| 2011/0019028 | A1* | 1/2011 | Kimijima et al. | 348/222.1 |
| 2011/0228053 | A1* | 9/2011 | Aoki | 348/49 |
| 2011/0234861 | A1* | 9/2011 | Endo | 348/243 |

FOREIGN PATENT DOCUMENTS

| CN | 101971610 A | 2/2011 |
| JP | 2000-324505 A | 11/2000 |
| JP | 2003-69889 A | 3/2003 |
| JP | 2006-191282 A | 7/2006 |
| JP | 2007-279512 A | 10/2007 |
| JP | 2009-244858 A | 10/2009 |
| WO | WO 2009/113701 A1 | 9/2009 |

OTHER PUBLICATIONS

Chinese Office Action with English translation dated May 22, 2013, for Application No. 201180019965.X.

* cited by examiner

*Primary Examiner* — Lin Ye
*Assistant Examiner* — John H Morehead, III
(74) *Attorney, Agent, or Firm* — Birch Stewart Kolasch & Birch, LLP

(57) ABSTRACT

An imaging apparatus body on which a lens unit including an imaging optical system and an identification information storage unit that stores specific identification information can be removably mounted, comprising a shading correction unit that corrects, when the determination unit determines that the correction table corresponding to the identification information of the mounted lens unit is stored in the correction table storage unit, the shading in the set of viewpoint images according to the correction table, corresponding to the identification information of the mounted lens unit, stored in the correction table storage unit.

8 Claims, 7 Drawing Sheets

NORMAL PIXEL (A)

PHASE DIFFERENCE PIXEL (B)

PHASE DIFFERENCE PIXEL (C)

IMAGING APPARATUS, IMAGING APPARATUS BODY, AND SHADING CORRECTING METHOD

This application is a continuation application and claims the priority benefit under 35 U.S.C. §120 of PCT Application No. PCT/JP2011/078389 filed on Dec. 8, 2011 which application designates the U.S., and also claims the priority benefit under 35 U.S.C. §119 of Japanese Patent Applications No. 2011-029854 filed on Feb. 15, 2011, which applications are all hereby incorporated in their entireties by reference.

TECHNICAL FIELD

The present invention relates to a technique for respectively focusing subject images, which have passed through different areas in two directions of a photographic lens, on an image sensor, to acquire different viewpoint images. Particularly, the present invention relates to a technique for correcting shading occurring in the viewpoint images.

BACKGROUND ART

As discussed in Patent Document 1, a light flux incident on an image sensor from an imaging lens includes a large number of components of light focused in an oblique direction in addition to components vertically incident on an imaging plane of the image sensor. Circles of confusion of light collected by microlenses respectively arranged to correspond to pixels on the imaging plane are not necessarily formed uniformly in a central portion of each of the pixels in the image sensor, and are shifted from the center of each of the pixels depending on a position of the pixel. Even if a plane having a uniform illuminance is photographed in a light receiving unit arranged in a peripheral portion of the imaging plane of the image sensor, therefore, an amount of received light is made smaller than that in a light receiving unit in a central portion of the imaging plane in the vicinity of an optical axis of the imaging lens. As a result, luminance shading, which causes a light-dark strain because brightness is not uniform depending on a position of the imaging plane, occurs in an imaging signal output from the image sensor, resulting in a deteriorated image quality.

In Patent Document 2, an image acquisition device causes gain control means to acquire lens information including at least information relating to a position of an exit pupil while acquiring an image signal to correspond to a position on an imaging plane of an image sensor, to control a gain for each color component of the image signal depending on lens information of various interchangeable lenses and a distance from the center of the imaging plane, and the interchangeable lens causes information supply means to supply lens information including information relating to a position of an exit pupil and a diaphragm value of a photographic lens to the image acquisition device as one of parameters used when the image acquisition device controls the gain for each color component of the image signal.

In Patent Document 3, a lens unit ROM (Read-Only Memory) provided in a lens unit of a digital single-lens reflex camera stores identification data for identifying a photographic lens. A system control circuit on the side of a camera body reads out the identification data. The digital signal processing circuit reads out, out of lens data exhibiting shading properties of a lens, which are previously stored in a camera ROM, the lens data about the photographic lens based on the identification data. Further, a digital signal processing circuit reads out image sensor data exhibiting shading properties of a CCD (Charge Coupled Device) from the camera ROM 56, and corrects shading of an image recorded in an image memory based on the lens data and the image sensor data.

Patent Document 4 includes a lens barrel for focusing a subject image on imaging means, correction value recording means for recording a correction value of a chromatic aberration of magnification, a distortion aberration, or shading, which is caused by the lens barrel, and output means for associating an image of the subject image focused on the imaging means and the correction value caused by the lens barrel, which is recorded on the correction value recording means, and outputting them to another communication equipment or a recording medium so that the image and correction information of the image can be recorded in association with each other, and a preferable image can be acquired by correcting various inconvenient phenomena caused by the lens barrel are corrected in an apparatus that outputs the image.

CITATION LIST

Patent Literature

PTL 1: Japanese Patent Application Laid-Open No. 2009-244858
PTL 2: Japanese Patent Application Laid-Open No. 2000-324505
PTL 3: Japanese Patent Application Laid-Open No. 2006-191282
PTL 4: Japanese Patent Application Laid-Open No. 2003-069889

SUMMARY OF INVENTION

Technical Problem

By a pixel array specific to an imaging apparatus of a pupil splitting type as discussed in Patent Documents 1 and 2, brightness between viewpoint images is not made uniform, and shading causing a light-dark strain occurs in each of the viewpoint images, resulting in a deteriorated image quality. The intensity of the shading varies depending on a photographing condition such as a diaphragm of a lens, an in-focus subject distance (a focus lens position), and a zoom magnification (a focal length). If a lens unit of the imaging apparatus is of an interchangeable type, a shading correction parameter for each lens unit and for each photographing condition is required.

To perform shading correction of a viewpoint image depending on each photographing condition in an imaging apparatus of an interchangeable lens type/pupil splitting type, it is considered that a correction parameter is calculated every time a lens is mounted or for each lens to be mounted. However, this is troublesome because the correction parameter needs to be calculated every time the lens is mounted in this case. Alternatively, it is considered that all correction parameters for each lens to be mounted are stored in a storage medium. However, the correction parameter becomes very long in this case, imposing a heavy burden on the capacity of the storage medium.

The present invention has been made in view of such problems, and is directed to correcting, in an imaging apparatus of an interchangeable lens type/pupil splitting type, shading of a viewpoint image using a parameter corresponding to a mounted lens without unnecessarily increasing a burden on the capacity of a storage medium and a burden on correction parameter calculation processing.

Solution to Problems

The present invention provides an imaging apparatus including an imaging apparatus body, and a lens unit removably mounted on the imaging apparatus body, in which the lens unit includes an imaging optical system, and an identification storage unit that stores identification information specific to the lens unit, the imaging apparatus body includes an identification information acquisition unit that acquires the identification information from the identification information storage unit in the mounted lens unit, and an imaging unit capable of outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically converting the light flux, a correction table storage unit capable of storing a correction table storing a one-dimensional parameter for correcting one-dimensional shading occurring in the disparity direction in the set of viewpoint images output by the imaging unit along the disparity direction to correspond to the identification information acquired by the identification information acquisition unit, a determination unit that determines whether the correction table corresponding to the identification information of the mounted lens unit is stored in the correction table storage unit, and a shading correction unit that corrects, when the determination unit determines that the correction table corresponding to the identification information of the mounted lens unit is stored in the correction table storage unit, the shading in the set of viewpoint images according to the correction table, corresponding to the identification information of the mounted lens unit, stored in the correction table storage unit.

The imaging apparatus body includes a photographing condition setting unit that sets a photographing condition of the mounted lens unit, the correction table storage unit can store the correction table to correspond to the identification information and the photographing condition, the correction table determines whether the correction table corresponding to the identification information of the mounted lens unit and the photographing condition set by the photographing condition setting unit is stored in the correction table storage unit, and the shading correction unit corrects, when the determination unit determines that the correction table corresponding to the identification information of the mounted lens unit and the photographing condition set by the photographing condition setting unit is stored in the correction table storage unit, the shading according to the correction table, corresponding to the identification information of the mounted lens unit and the photographing condition set by the photographing condition setting unit, stored in the correction table storage unit.

The photographing condition includes at least one of a diaphragm, a focal length, and an in-focus subject distance.

The imaging apparatus further includes a correction table calculation unit that calculates, when the determination unit determines that the correction table corresponding to the identification information of the mounted lens unit is not stored in the correction table storage unit, the correction table corresponding to the mounted lens unit based on the set of viewpoint images output from the imaging unit, and stores the calculated correction table in the correction table storage unit to correspond to the identification information.

The imaging apparatus further includes a correction table calculation unit that calculates, when the determination unit determines that the correction table corresponding to the identification information of the mounted lens unit and the photographing condition set by the photographing condition setting unit is not stored in the correction table storage unit, the correction table corresponding to the mounted lens unit and the photographing condition set by the photographing condition setting unit based on the set of viewpoint images output from the imaging unit, and stores the calculated correction table in the correction table storage unit to correspond to the identification information and the photographing condition.

The present invention provides an imaging apparatus body on which a lens unit including an imaging optical system and an identification information storage unit that stores specific identification information can be removably mounted, including an identification information acquisition unit that acquires the identification information from the identification information storage unit in the mounted lens unit, and an imaging unit capable of outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically converting the light flux, a correction table storage unit capable of storing a correction table storing a one-dimensional parameter for correcting one-dimensional shading occurring in the disparity direction in the set of viewpoint images output by the imaging unit along the disparity direction to correspond to the identification information acquired by the identification information acquisition unit, a determination unit that determines whether the correction table corresponding to the identification information of the mounted lens unit is stored in the correction table storage unit, and a shading correction unit that corrects, when the determination unit determines that the correction table corresponding to the identification information of the mounted lens unit is stored in the correction table storage unit, the shading in the set of viewpoint images according to the correction table, corresponding to the identification information of the mounted lens unit, stored in the correction table storage unit.

The present invention provides a shading correcting method including, in an imaging apparatus body on which a lens unit including an imaging optical system and an identification information storage unit that stores specific identification information can be removably mounted, including the steps of acquiring the identification information from the identification information storage unit in the mounted lens unit, outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically converting the light flux, storing a correction table storing a one-dimensional parameter for correcting one-dimensional shading occurring in the disparity direction in the output set of viewpoint images along the disparity direction to correspond to the acquired identification information, determining whether the correction table corresponding to the identification information of the mounted lens unit is stored, and correcting, when it is determined that the correction table corresponding to the identification information of the mounted lens unit is stored, the shading in the set of viewpoint images according to the correction table corresponding to the identification information of the mounted lens unit.

Advantageous Effects of Invention

According to the present invention, if a correction table corresponding to a mounted imaging unit is stored, one-dimensional shading occurring in a disparity direction in a main image/sub-image is corrected using the correction table. Every time the same imaging unit as the previous one is mounted, therefore, processing for determining the correction table is omitted.

If the correction table corresponding to the mounted imaging unit is not stored, a correction table corresponding to a set photographing condition is calculated and stored. If the imaging unit is mounted after that, the shading of the main image/sub-image is corrected using a correction table corresponding to the imaging unit.

Since the shading is one-dimensional, a parameter stored in the correction table for each imaging unit may be a one-dimensional value. A burden on a storage capacity therefor is smaller than that when a correction table storing a two-dimensional parameter is stored.

DESCRIPTION OF EMBODIMENTS

First Embodiment

Figure 1:
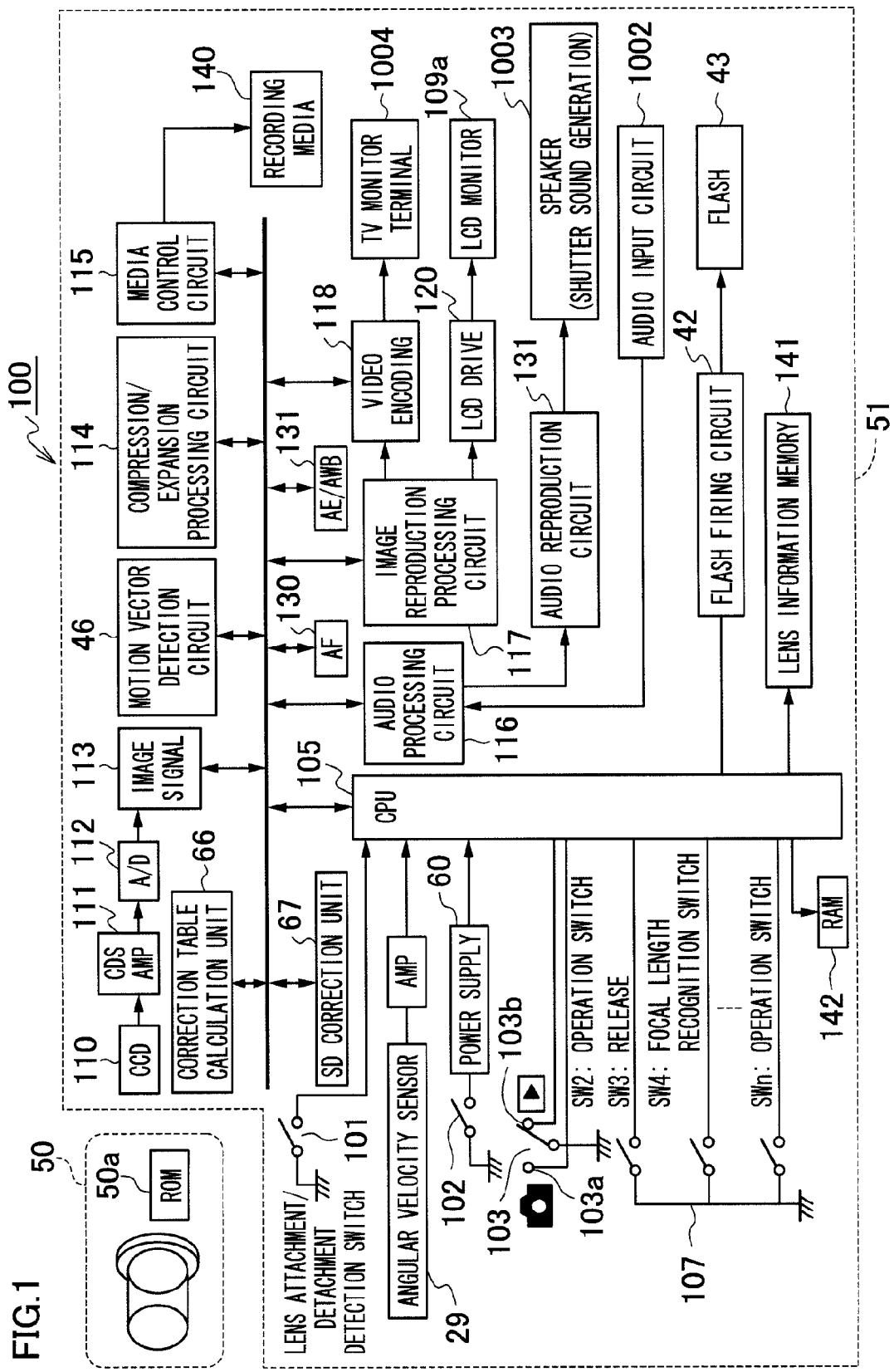
FIG. 1 is a block diagram of a camera according to a first embodiment.

FIG. 1 is a block diagram illustrating a configuration of a digital camera 100 according to a first embodiment. The digital camera 100 includes an interchangeable lens unit 50 and a camera body 51.

The lens unit 50 can be mounted on the camera body 51 directly or via a mount converter. The lens unit 50 includes a lens ROM 50a serving as a storage medium containing lens information. The lens information can include identification information specific to the lens unit 50, firmware relating to processing for driving control for making an imaging optical system including a zoom lens, a focus lens, a diaphragm, a shutter, and their driving system, an image stabilization device, and other functions, which are included in the lens unit 50, effectively function in the camera body 51, and numerical information (a setting parameter) relating to the driving control.

A plurality of lens units 50, which can be mounted on the camera body 51, exists, and is a mixture of one that records identification information, a parameter, or the like, one that records only identification information, and one that records no identification information. Accordingly, the camera body 51 cannot recognize the presence or absence of recording information of the lens unit 50 and its content until the lens unit 50 is mounted on the camera body 51.

A CPU (Central Processing Unit) 105 integrally controls an operation of the digital camera 100. The CPU 105 contains a ROM, and a program is stored in the contained ROM. The CPU 105 controls the overall operation of the digital camera 100 according to a procedure of the program. All a power switch 102, a photographing/reproduction mode switching lever 103, and a group of other switches 107 are connected to the CPU 105. When any one of the switches is operated, an operation signal corresponding to the CPU 105 is input.

When a lens attachment/detachment detection switch 101 detects that the lens unit 50 has been mounted or removed on or from the camera body 51, its detection signal is input to the CPU 105. The mounting of the lens unit 50 can be detected when a contact of the lens attachment/detachment detection switch 101 is turned on, and the removal thereof can be detected when the contact is turned off. A camera shake detection signal is input to the CPU 105 from an angular velocity sensor 29 serving as a camera shake detection unit.

First, when the power switch 102 is turned on, the CPU 105 detects that the power switch 102 has been turned on so that power is supplied to each block. When the CPU 105 detects that the lens unit 50 has been mounted, the CPU 105 starts photographing processing or reproduction processing. The CPU 105 detects a switching position of the photographing/reproduction mode switching lever 103 when power has been applied, and an image reproduction processing circuit 117 controls an LCD (Liquid Crystal Display) drive circuit 120 so that image display processing is started to display a through image on an LCD monitor 109a if the detected switching position is in a photographing mode 103a, and displays an image based on image data recorded on a recording media 140 if the switching position is in a reproduction mode 103b.

Photographing processing will be briefly described.

The CPU 105 detects that the photographing/reproduction switching lever 103 has been switched to the photographing mode 103a to start the photographing processing, to output image data representing a subject, which has been focused on a phase difference CCD (Charge Coupled Device) 110, to a CDSAMP (Correlated Double Sampling Amplifier) 111 for each predetermined interval. The image data output for the predetermined interval is processed in a signal processing stage subsequent to an A/D (Analog-to-Digital) converter 112 to obtain a through image, and the through image is displayed on the LCD monitor 109a. Consequently, a subject in a range captured by the lens unit 50 looks as if it were a moving image, and is displayed on the LCD monitor 109a.

The LCD monitor 109a is stereoscopic display means capable of displaying stereoscopic viewpoint images (a left viewpoint image and a right viewpoint image) as directional images each having predetermined directivity using a parallax barrier. However, the present invention is not limited to this. The LCD monitor 109a may be one using a lenticular lens and one capable of individually seeing the left viewpoint image and the right viewpoint image by wearing dedicated glasses such as polarization glasses and liquid crystal shutter glasses.

The zoom lens in the lens unit 50 moves between a telephoto end and a wide-angle end by operating a focal length recognition switch SW4 included in the switch group 107, and its focal length is changed to any value.

If AF (Automatic Focus)/AE (Automatic Exposure) operates (only when the lens unit 50 corresponds to the AF/AE) by a half press operation of a release switch SW3 included in the switch group 107, exposure time control for the phase difference CCD 110, and diaphragm control for the lens unit 50 and focusing control for the focus lens are performed. If the luminance of the subject is lower than a predetermined value, a flash firing circuit 42 charges a discharging capacitor. The flash firing circuit 42 starts to discharge the capacitor to fire a flash 43 by a full press operation of the release switch SW3 so that the subject is photographed.

A user optionally performs framing and photographing based on the through image displayed on the LCD monitor 109a. Therefore, an AF detection circuit 130 always detects an in-focus position, to move the focus lens in the lens unit 50 to the in-focus position using a focus adjustment mechanism so that the subject in a direction toward which the digital camera 100 is directed is immediately displayed as a through image. The focus adjustment mechanism includes a focus lens, a motor that drives the focus lens based on a detection result of the in-focus position of the AF detection circuit, a lead screw that moves the focus lens using the motor, and a sensor that detects a position of the focus lens that has moved by rotating the lead screw, though the illustration thereof is omitted.

The in-focus position is detected by contrast AF processing or phase difference AF processing. If the contrast AF processing is performed, a high-frequency component of image data within a predetermined focus area in at least one of left viewpoint image data and right viewpoint image data, and integrates the high-frequency component, to calculate an AF evaluation value representing an in-focus state. AF control is performed by controlling the focus lens within the lens unit 50 so that the AF evaluation value reaches its maximum. If the phase difference AF processing is performed, a phase difference between image data respectively corresponding to a main pixel and a sub-pixel within a predetermined focus area in the left viewpoint image data and the right viewpoint image data is detected, and a defocus amount is found based on information representing the phase difference. AF control is performed by controlling the focus lens within the lens unit 50 so that the defocus amount becomes zero.

An AE and AWB (Automatic White Balance) detection unit (not illustrated) detects a luminance of field in addition to focus adjustment in the focus adjustment mechanism, to set a small aperture or a full aperture by switching, and adjust a gain of each of signals in R, G, and B colors to perform white balance adjustment, to display a clear through image on the LCD monitor 109a. The user performs framing while seeing the through image, to perform a release operation at a photo opportunity.

When the release switch SW3 is fully pressed so that the release operation is performed, the CPU 105 supplies a timing signal to the phase difference CCD 110 from a timing generator (not illustrated) to focus an image at the time of the release operation on the phase difference CCD 110. The timing signal is for notifying the phase difference CCD 110 of start of exposure and end of exposure, and corresponds to a so-called shutter speed. The CPU 105 outputs image data (composed of the three primary colors R, G, and B of RGB light) from the phase difference CCD 110 at the end of exposure. The output image data is supplied to the CDSAMP 111 in the succeeding stage. In the CDSAMP 111, noise of the image data output from the phase difference CCD 110 is reduced, and the image data, the noise of which has been reduced, is supplied to the A/D converter 112. Image data composed of R, G, and B, which has been converted into a digital signal by the A/D converter 112, is supplied to an image signal processing circuit 113. The image signal processing circuit 113 converts an RGB signal into a YC (Luminance/Chrominance) signal. Further, this YC signal is supplied to a compression/expansion processing circuit 114, and is compressed therein. The compressed image data is recorded as an image file on the recording media 140 via a media control circuit 115.

All or some of the phase difference CCD 110 to the image signal processing circuit 113 may be provided in the camera body 51, or may be provided in the lens unit 50.

An operation relating to reproduction processing will be described below.

The CPU 105 causes the media control circuit 115 to read out the image data recorded in the recording media 140 when it detects that the photographing/reproduction mode switching lever 103 has been switched toward the reproduction mode 103b, and to supply the image data, which has been subjected to expansion processing in the compression/expansion processing circuit 114, to the image reproduction processing circuit 117. In the image reproduction processing circuit 117, the expanded image data is subjected to processing in an LCD monitor, and the image data, which has been subjected to the processing, is then output to the LCD drive circuit 120. The LCD drive circuit 120 drives the LCD monitor 109a upon receipt of the image data, and displays an image based on the image data on the LCD monitor 109a. In this reproduction, an image based on the image data most newly recorded is reproduced and displayed unless otherwise stated.

The CPU 105 enables a motion vector detection circuit 46 to detect the occurrence of a camera shake from a shake amount of the whole image.

Identification information of the lens unit 50 actually mounted, firmware relating to processing for driving control for making a zoom, a focus, a diaphragm, a shutter, an image stabilization device, and other functions, which are included in the lens unit 50, effectively function in the camera body 51, and numerical information and a photographing condition (a setting parameter) relating to the driving control are recorded in a lens information memory 141. The lens information memory 141 includes various recording media such as a RAM (Random Access Memory) and a hard disk.

Audio recorded by an audio input circuit (a microphone) 1002, together with a moving image, is recorded on the recording media 140. The audio is supplied to an audio processing circuit 116, and is converted into audio data suitable for a speaker 1003 by an audio reproduction circuit 131.

To enable a reproduced image to be enjoyed on a TV monitor using a TV monitor terminal 1004 for the digital camera 100, the image data read out of the recording media 140 is converted into image data that can be displayed on a TV (Television) monitor using a video encoding circuit 118, and moving image data is then output to the exterior.

A lens information memory 141 can store a plurality of one-dimensional correction tables for main pixels and a plurality of one-dimensional correction tables for sub-pixels depending on a set of three parameters (photographing conditions), i.e., a focal length, a subject distance, and a diaphragm stage for each lens unit 50. In the digital camera 100, when the focal length, the subject distance, and the diaphragm (photographing conditions) are changed, an incident angle at which a light flux is incident on each photodiode in a phase difference CCD 17 differs so that a shading shape in a horizontal direction greatly changes. Therefore, one, corresponding to the photographing condition, of the one-dimensional correction tables stored in the lens information memory 141 can be selected to correspond to a shading property that differs depending on the photographing condition.

Figure 2:
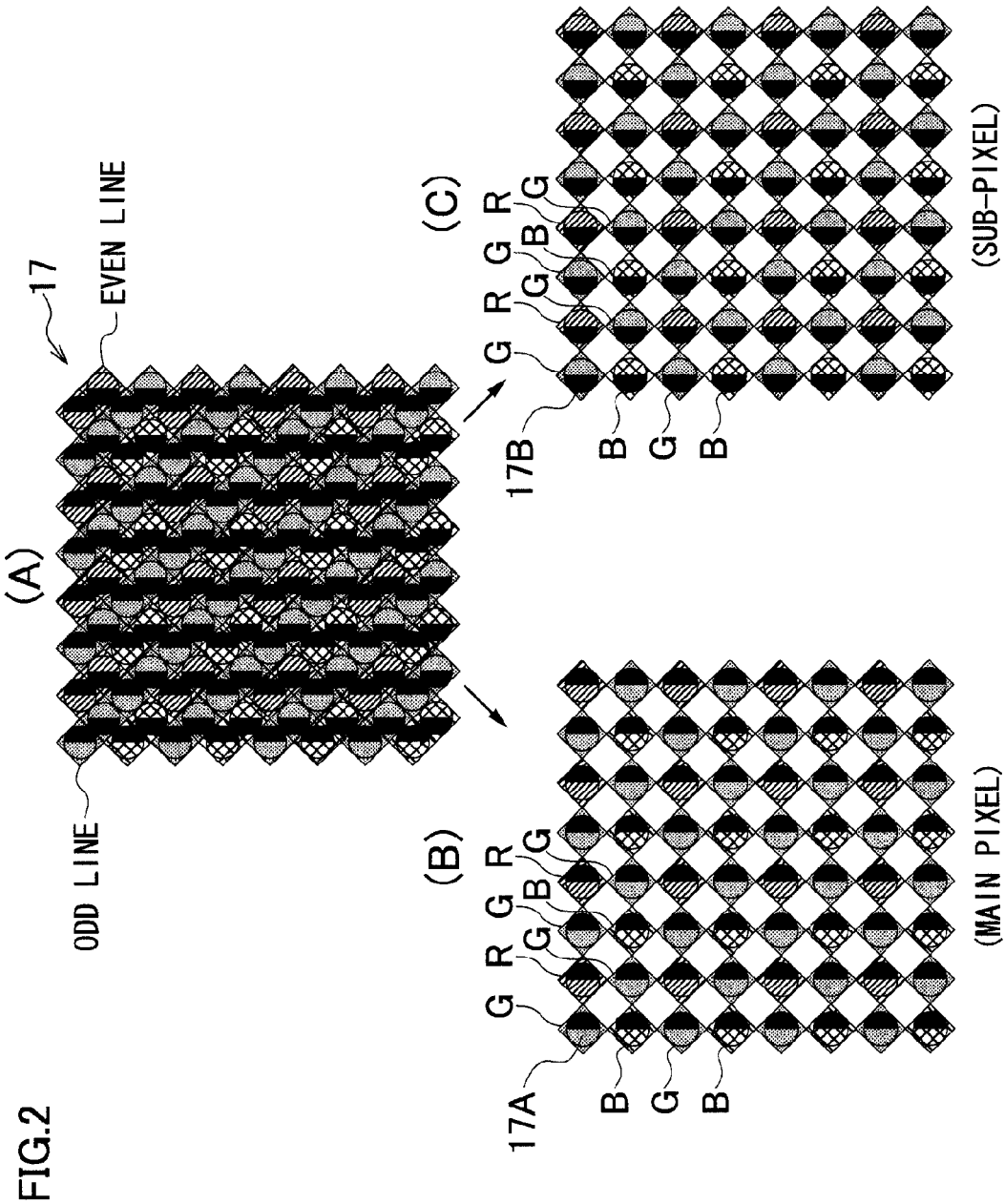
FIG. 2 illustrates an example of a configuration of a pupil-split disparity image acquisition image sensor CCD.

FIG. 2 is a diagram illustrating an example of a configuration of the phase difference CCD 110.

The phase difference CCD 110 has odd-line pixels (main pixels, which are also referred to as A-plane pixels) and even-line pixels (sub-pixels, which are also referred to as B-plane pixels), which are each arranged in a matrix shape, and image signals corresponding to two planes, which have been photoelectrically converted at the main pixels and the sub-pixels, respectively, can be independently read out.

As illustrated in FIG. 2, lines each having a pixel array of GRGR ... and lines each having a pixel array of BGBG ... out of pixels respectively having color filters in R (red), G (green), and B (blue) are alternately provided on odd lines (1, 3, 5, ...) of the phase difference CCD 110. On the other hand, lines each having a pixel array of GRGR ... and lines each having a pixel array of BGBG ... out of the pixels are alternately provided on even lines (2, 4, 6, ...), similarly to those on the odd lines. The pixels on the odd lines are shifted in a line direction only by a half pitch from the pixels on the even lines.

Figure 3:
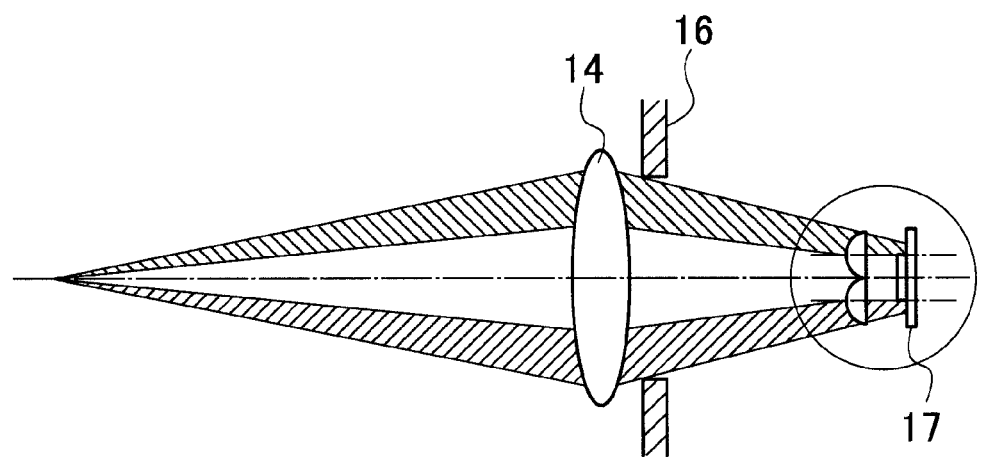
FIG. 3 illustrates respective ones of first and second pixels.
Figure 4:
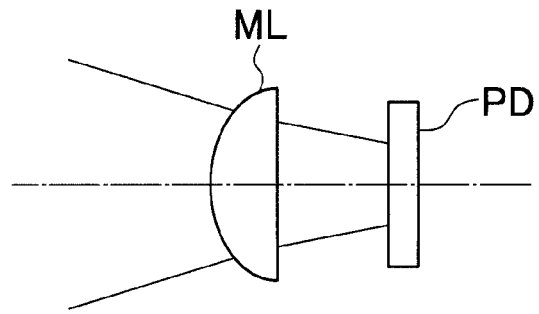
FIG. 4 is an enlarged view of a principal part of FIG. 3.
Figure 4:
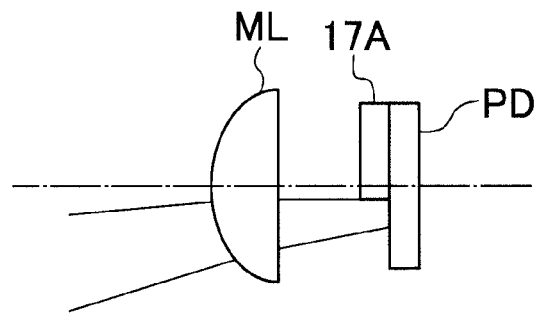
Figure 4:
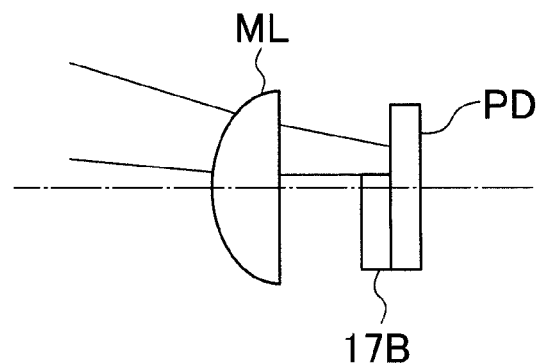

FIG. 3 is a diagram illustrating a photographic lens 14 and respective ones of the main pixels and the sub-pixels in the phase difference CCD 110, and FIG. 4 is an enlarged view of a principal part of FIG. 3.

A light shielding member 17A is disposed on a front surface (on the side of a microlens ML) of the main pixel in the phase difference CCD 110, and a light shielding member 17B is disposed on a front surface of the sub-pixel therein. Each of the light shielding members 17A and 17B has a function of a pupil splitting member. As indicated by a portion (A) illustrated in FIG. 4, a light flux that passes through an exit pupil is incident on a normal pixel (photodiode PD) in the CCD without being limited via the microlens ML. As indicated by a portion (B) illustrated in FIG. 4, the light shielding member 17A blocks a right half of a light receiving surface of the main pixel (photodiode PD). Therefore, only the left of an optical axis of the light flux that passes through the exit pupil is received in the main pixel. As indicated by a portion (C) illustrated in FIG. 4, the light shielding member 17B blocks a left half of a light receiving surface of the sub pixel (photodiode PD). Therefore, only the right of the optical axis of the light flux that passes through the exit pupil is received in the sub-pixel. Thus, each of the light shielding members 17A and 17B serving as pupil splitting means splits the light flux, which passes through the exit pupil, into right and left portions.

A mechanism for capturing a stereoscopic image using the phase difference CCD 110 by thus receiving only the left of the optical axis of the light flux, which passes through the exit pupil, on the main pixel in the phase difference CCD 110 and receiving only the right of the optical axis of the light flux, which passes through the exit pupil, on the sub-pixel will be described.

Figure 5:
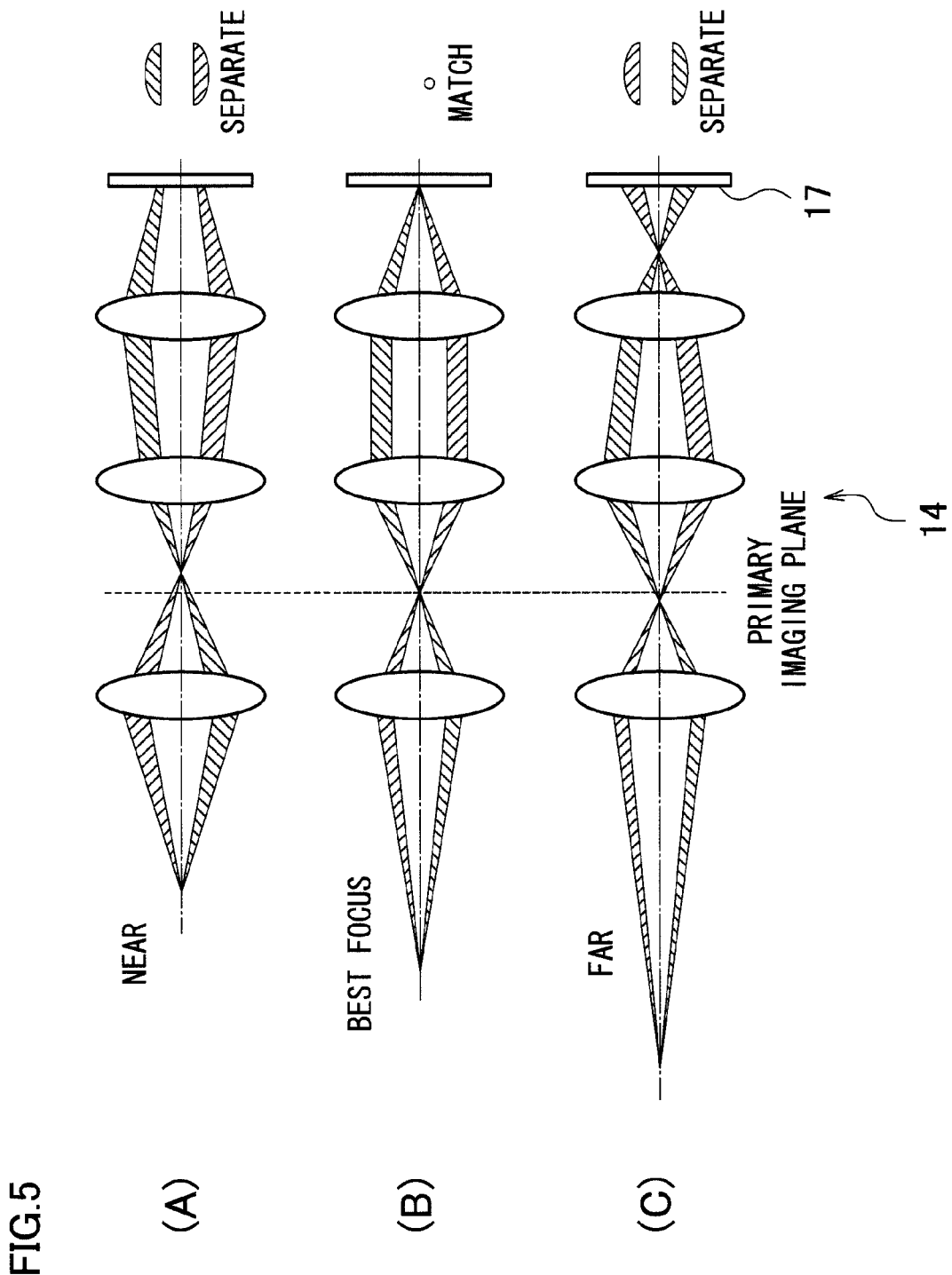
FIG. 5 is a diagram illustrating a separated state of an image focused on an image sensor depending on a difference among a front focus, an in-focus (best focus), and a rear focus.

Portions (A) to (C) illustrated in FIG. 5 respectively indicate separated states of an image focused on an image sensor depending on whether a focus lens is in front focus, in focus (in best focus), and in rear focus. In FIG. 5, a diaphragm is omitted to compare differences in separation by focusing.

Out of images obtained by pupil splitting, the image that is in focus is focused (matched) at the same position on the image sensor, as indicated by the portion (B) illustrated in FIG. 5, and each of the images that are in front focus and rear focus is focused (separated) at different positions on the image sensor, as indicated by the portions (A) and (C) illustrated in FIG. 5.

Therefore, a subject image, which has been pupil-split in the horizontal direction, is acquired via the phase difference CCD 110 so that a left viewpoint image and a right viewpoint image (a stereoscopic image), which differ in disparity depending on a focus position, can be acquired. More specifically, a disparity at the in-focus position becomes zero, and a position of a 3D reproduced image (a position of a virtual image) matches a display surface. A position at which the disparity becomes zero is shifted backward as the in-focus position is shifted backward so that the subject on the display surface looks projected from the display surface. On the other hand, the position at which the disparity becomes zero is shifted forward as the in-focus position is shifted forward so that the subject on the display surface looks moving backward from the display surface.

FIG. 5 illustrates how an incident angle of a light flux on the light receiving surface of the phase difference CCD 110 changes depending on an in-focus subject distance (a focus lens position). While the phase difference CCD 110 having the above-mentioned configurations is configured so that the light shielding members 17A and 17B respectively limit light fluxes in different areas (a right half and a left half) of the main pixel and the sub-pixel, the present invention is not limited to this. The microlens ML and the photodiode PD may be relatively shifted in the horizontal direction without providing the light shielding members 17A and 17B so that a light flux incident on the photodiode PD is limited depending on a direction of the shifting. Alternatively, one microlens may be provided for two pixels (a main pixel and a sub-pixel) so that a light flux incident on each of the pixels is limited.

The incident angle of the light flux on the light receiving surface of the phase difference CCD 110 changes depending on an opening size of the diaphragm and a position of the zoom lens, the illustration of which is omitted. The intensity of shading occurring in each of the left viewpoint image and the right viewpoint image depends on the measure of the incident angle of the light flux.

Figure 6:
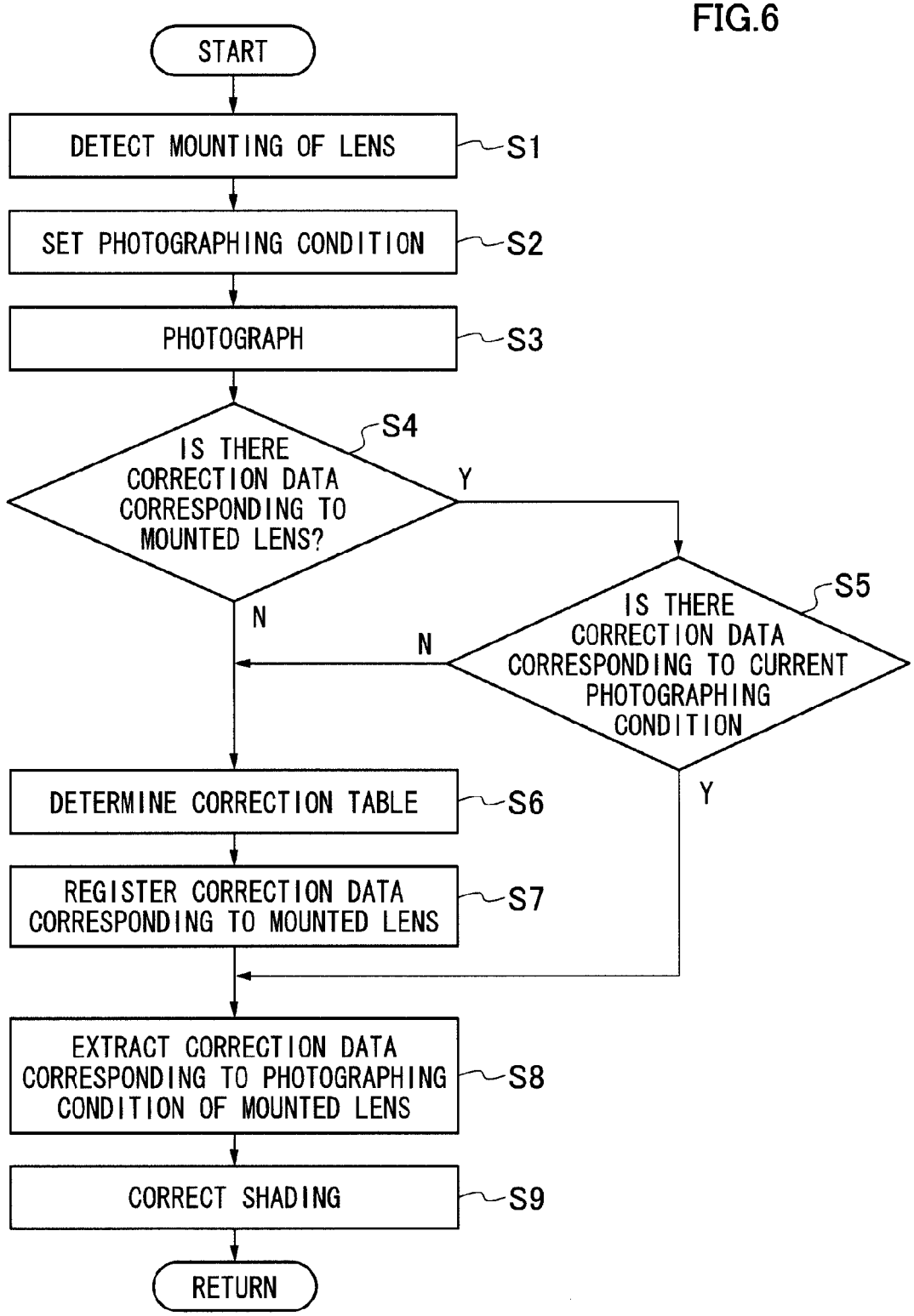
FIG. 6 is a flowchart illustrating shading correction processing.

FIG. 6 is a flowchart illustrating the flow of shading correction processing for performing shading correction for two image data, which have been respectively output from the main pixel and the sub-pixel in the phase difference CCD 110 and processed by an analog signal processing unit 60. The CPU 105 mainly controls the following processing.

In S1, the CPU 105 causes the lens attachment/detachment detection switch 101 to detect mounting of the lens unit 50 on the camera body 51. A shading correction unit 67 stores, when it acquires lens information such as identification information from the mounted lens unit 50, the lens information in the lens information memory 141.

In S2, the CPU 105 receives setting and definition of a photographing condition of the lens unit 50, the mounting of which has been detected. The photographing condition includes a set of an in-focus position of the focus lens in the lens unit 50 (an in-focus subject distance), a diaphragm value of the lens unit 50, and any zoom stage (focal length) of the zoom lens in the lens unit 50. The photographing condition is defined automatically, manually or semiautomatically for AF/AE processing and an operation of the zoom switch SW4. The CPU 105 controls a driving system of the lens unit 50 at a value of the defined photographing condition, In S3, the CPU 105 performs AF/AE by a half-press operation of the release switch SW3. The CPU 105 causes a correction table calculation unit 66 to respectively acquire two image data corresponding to a main image and a sub-image from the main pixel and the sub-pixel in the phase difference CCD 17 under the photographing condition set in S2, when the release switch SW3 is fully pressed so that a release operation is performed.

In S4, the CPU 105 determines whether correction tables corresponding to the identification information acquired in S1 are stored in the lens information memory 141. If the answer is affirmative, the processing proceeds to S5. If the answer is negative, the processing proceeds to S6.

In S5, the CPU 105 determines whether the correction table corresponding to the photographing condition set in S2 out of the correction tables corresponding to the identification information acquired in S1 is stored in the lens information memory 141. If the answer is affirmative, the processing proceeds to S8. If the answer is negative, the processing proceeds to S6.

Figure 7:
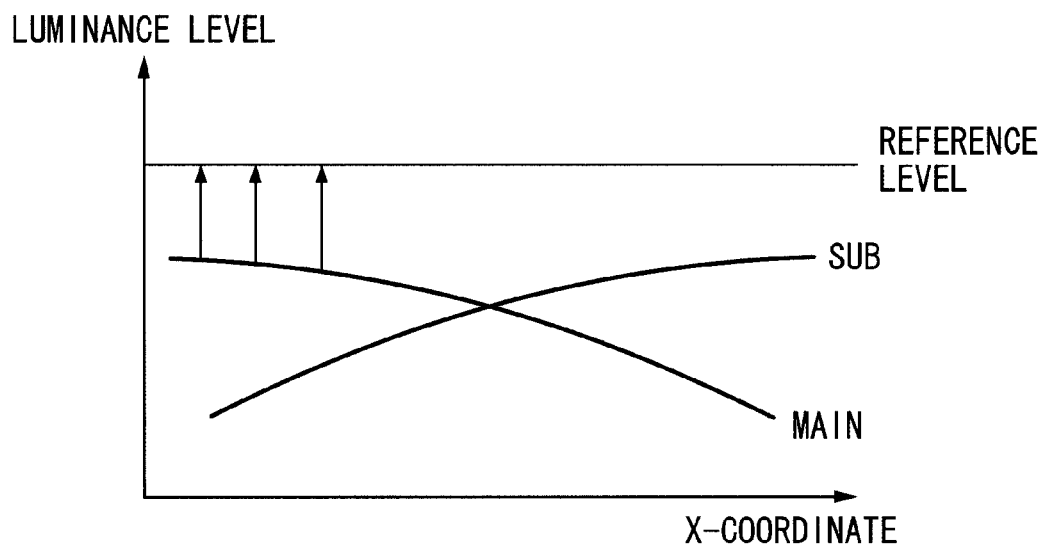
FIG. 7 is a diagram illustrating an example of a one-dimensional luminance distribution of a main image and a one-dimensional luminance distribution of a sub-image.

In S6, the correction table calculation unit 66 respectively projects luminance levels of the two image data obtained in S3 on a one-dimensional coordinate axis along a pupil splitting direction, here a horizontal axis X, to obtain a one-dimensional luminance level distribution of the main image and a one-dimensional luminance level distribution of the sub-image. FIG. 7 schematically illustrates how such processing is performed.

Figure 8:
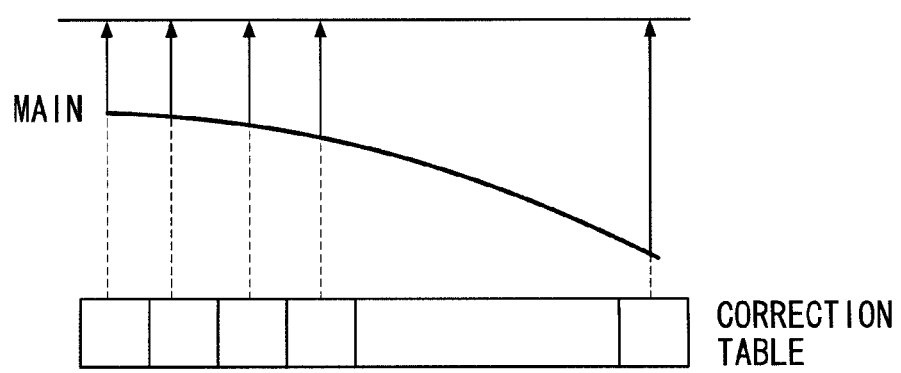
FIG. 8 is a diagram illustrating an example of a correction table.

The correction table calculation unit 66 compares the one-dimensional luminance distribution of the main image with a predetermined one-dimensional luminance level reference, to calculate a difference from the reference. A luminance gain for compensating for the difference is determined for the correction table for the main image. FIG. 8 schematically illustrates how such processing is performed.

Similarly, the correction table calculation unit 66 compares the one-dimensional luminance distribution of the sub-image with a predetermined one-dimensional luminance level reference, to calculate a difference from the reference. A luminance gain for compensating for the difference is determined in the correction table for the sub-image.

Each of the correction tables defines one-dimensional luminance gains respectively corresponding to coordinates in the one-dimensional coordinate axis along the pupil splitting direction.

The correction table for the main image and the correction table for the sub-image may be shared by rotating reading of the luminance gain defined by the same correction table forward or backward along the pupil splitting direction without separately storing the correction table for the main image and the correction table for the sub-image in the lens information memory 141.

All luminance gains respectively corresponding to the pixels need not be continuously included in the correction table, and a discrete luminance gain may be included in the correction table. For example, every four pixels, a corresponding luminance gain may be included in the correction table.

In S7, the correction table calculation unit 66 associates the identification information acquired in S1, the photographing condition set in S2, and the correction tables for the main image and the sub-image determined in S6, and stores them in the lens information memory 141.

A driving system such as a stepping motor drives a lens and a diaphragm at a discrete stop position. Therefore, a zoom lens position, a focus lens position, and a diaphragm value respectively take discrete values. Therefore, the number of sets of respective three parameters (photographing conditions), i.e., focal lengths, subject distances, and diaphragm values of each of the lens units 50 is finite, and the number of one-dimensional correction tables corresponding to each of the sets is also finite.

In S8, the shading correction unit 67 extracts the identification information acquired in step S1 and the correction table corresponding to the photographing condition set in S2 from the lens information memory 141.

In S9, the shading correction unit 67 refers to the correction table extracted in S8, and adds a luminance gain, corresponding to an X-coordinate of each of pixels in any main image/sub-image (typically, the main image/sub-image captured in S3), which has been captured under the same photographing condition as the photographing condition in S2, to a signal representing the luminance of the pixel, to correct shading.

If the correction table includes the discrete luminance gain, the shading correction unit 67 interpolates luminance gains corresponding to the two pixels with a pixel to be corrected sandwiched therebetween depending on a distance from each of the two pixels, to find a luminance gain corresponding to the pixel to be corrected and correct the luminance of the pixel to be corrected at the luminance gain.

The corrected main image/sub-image is recorded in the recording media 140, and is displayed on the LCD monitor 109a.

The above-mentioned processing can be repeated every time lens mounting is detected. The number of main images/sub-images to be corrected is any number.

If the correction table corresponding to the photographing condition of the mounted lens unit 50 is thus stored in the lens information memory 141, the shading of the main image/sub-image is corrected using the correction table corresponding to the lens unit 50.

If the correction table corresponding to the photographing condition of the mounted lens unit 50 is not stored in the lens information memory 141, the correction table corresponding to the set photographing condition is calculated based on the main image/sub-image obtained by the full press operation of the release switch SW3, and is stored in the lens information memory 141. A photographer only performs photographing without being particularly conscious of the presence or absence of the correction table so that the correction table is stored. If the lens unit is then mounted again so that the same photographing condition is set, the shading of the main image/sub-image is corrected using the correction table corresponding to the photographing condition of the lens unit 50.

Every time the same lens unit 50 as the previous one is mounted, and the same photographing condition as the previous one is set, therefore, processing for determining the correction table is omitted.

The correction table stored in the lens information memory 141 is one-dimensional to correspond to the fact that shading occurs along a one-dimensional pupil splitting direction. Therefore, a burden on the storage capacity of the lens information memory 141 is smaller than that when a two-dimensional correction table is stored.

Another Embodiment

Even when the set photographing condition does not match the correction table stored in the lens information memory 141 in S5, if a plurality of correction tables corresponding to a photographing condition close to the set photographing condition are stored in the lens information memory 141, the correction tables may be interpolated to generate a correction table corresponding to the set photographing condition in S6, and the generated correction table may be used to correct shading in step S9.

Alternatively, if the correction table corresponding to the identification information of the mounted lens is not stored in the lens information memory 141 in S4, the correction table corresponding to the photographing condition in S2 is calculated in S6. In this case, the CPU 105 compares the calculated correction table and the correction table corresponding to the photographing condition in S2, which has already been registered in the lens information memory 141, and determines whether the registered correction table exists in the lens information memory 141 where all errors in a luminance gain at its pupil splitting position are within a predetermined range.

The CPU 105 identifies, when it determines that the correction table exists in the lens information memory 141, identification information of a lens corresponding to the correction table as the identification information of the mounted lens. Correction tables corresponding to the identification information of the mounted lens are considered to be stored in the lens information memory 141 as correction tables for lenses that have been identified as the mounted lens. More specifically, the shading correction unit 67 corrects shading using one, corresponding to the photographing condition optionally set, of the correction tables for the lenses that have been identified as the mounted lens.

More specifically, if a correction table for another lens having a similar luminance gain under a specific photographing condition has already existed even if the mounted lens is unclear, an image obtained under another photographing condition with respect to the mounted lens is conveniently corrected using a correction table corresponding to the other photographing condition of the other lens, to enable shading correction even if the lens is unclear.

Further, the above-mentioned correction processing can be applied to a camera body 51 having a plurality of pupil splitting directions. For example, in a camera body 51 in which pupil splitting directions include a vertical direction and a horizontal direction and four viewpoint images are obtained, for example, one-dimensional correction tables may be respectively stored in the lens information memory 141 for the horizontal direction and the vertical direction. Alternatively, a camera body 51 in which pupil splitting directions include a vertical direction, a horizontal direction, and an oblique direction and nine viewpoint images are obtained, one-dimensional correction tables may be respectively stored in the lens information memory 141 for the vertical direction, the horizontal direction, and the oblique direction.

REFERENCE SIGNS LIST

50 . . . lens unit, 51 . . . camera body, 66 . . . correction table calculation unit, 67 . . . shading correction unit, 105 . . . CPU, 110 . . . phase difference CCD, 141 . . . lens information memory

The invention claimed is:

1. An imaging apparatus comprising an imaging apparatus body, and a lens unit removably mounted on the imaging apparatus body, wherein
the lens unit includes
an imaging optical system, and an identification storage unit that stores identification information specific to the lens unit,
the imaging apparatus body includes
an identification information acquisition unit that acquires the identification information from the identification information storage unit in the mounted lens unit, and
an imaging unit capable of outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically convert the light flux,
a correction table storage unit capable of storing a correction table storing a one-dimensional parameter for correcting one-dimensional shading occurring in the disparity direction in the set of viewpoint images output by the imaging unit along the disparity direction to correspond to the identification information acquired by the identification information acquisition unit,
a determination unit that determines whether the correction table corresponding to the identification information of the mounted lens unit is stored in the correction table storage unit, and
a shading correction unit that corrects, when the determination unit determines that the correction table corresponding to the identification information of the mounted lens unit is stored in the correction table storage unit, the shading in the set of viewpoint images according to the correction table, corresponding to the identification information of the mounted lens unit, stored in the correction table storage unit.

2. The imaging apparatus according to claim 1, wherein
the imaging apparatus body includes a photographing condition setting unit that sets a photographing condition of the mounted lens unit,
the correction table storage unit can store the correction table to correspond to the identification information and the photographing condition,
the correction table determines whether the correction table corresponding to the identification information of the mounted lens unit and the photographing condition set by the photographing condition setting unit is stored in the correction table storage unit, and
the shading correction unit corrects, when the determination unit determines that the correction table corresponding to the identification information of the mounted lens unit and the photographing condition set by the photographing condition setting unit is stored in the correction table storage unit, the shading according to the correction table, corresponding to the identification information of the mounted lens unit and the photographing condition set by the photographing condition setting unit, stored in the correction table storage unit.

3. The imaging apparatus according to claim 2, wherein the photographing condition includes at least one of a diaphragm, a focal length, and an in-focus subject distance.

4. The imaging apparatus according to claim 1, further comprising a correction table calculation unit that calculates, when the determination unit determines that the correction table corresponding to the identification information of the mounted lens unit is not stored in the correction table storage unit, the correction table corresponding to the mounted lens unit based on the set of viewpoint images output from the imaging unit, and stores the calculated correction table in the correction table storage unit to correspond to the identification information.

5. The imaging apparatus according to claim 2, further comprising a correction table calculation unit that calculates, when the determination unit determines that the correction table corresponding to the identification information of the mounted lens unit and the photographing condition set by the photographing condition setting unit is not stored in the correction table storage unit, the correction table corresponding to the mounted lens unit and the photographing condition set by the photographing condition setting unit based on the set of viewpoint images output from the imaging unit, and stores the calculated correction table in the correction table storage unit to correspond to the identification information and the photographing condition.

6. The imaging apparatus according to claim 3, further comprising a correction table calculation unit that calculates, when the determination unit determines that the correction table corresponding to the identification information of the mounted lens unit and the photographing condition set by the photographing condition setting unit is not stored in the correction table storage unit, the correction table corresponding to the mounted lens unit and the photographing condition set by the photographing condition setting unit based on the set of viewpoint images output from the imaging unit, and stores the calculated correction table in the correction table storage unit to correspond to the identification information and the photographing condition.

7. An imaging apparatus body on which a lens unit including an imaging optical system and an identification information storage unit that stores specific identification information can be removably mounted, comprising:
  an identification information acquisition unit that acquires the identification information from the identification information storage unit in the mounted lens unit, and
  an imaging unit capable of outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically converting the light flux,
  a correction table storage unit capable of storing a correction table storing a one-dimensional parameter for correcting one-dimensional shading occurring in the disparity direction in the set of viewpoint images output by the imaging unit along the disparity direction to correspond to the identification information acquired by the identification information acquisition unit,
  a determination unit that determines whether the correction table corresponding to the identification information of the mounted lens unit is stored in the correction table storage unit, and
  a shading correction unit that corrects, when the determination unit determines that the correction table corresponding to the identification information of the mounted lens unit is stored in the correction table storage unit, the shading in the set of viewpoint images according to the correction table, corresponding to the identification information of the mounted lens unit, stored in the correction table storage unit.

8. A shading correcting method comprising, in an imaging apparatus body on which a lens unit including an imaging optical system and an identification information storage unit that stores specific identification information can be removably mounted, the steps of:
  acquiring the identification information from the identification information storage unit in the mounted lens unit,
  outputting a set of viewpoint images between which there is a disparity in a predetermined disparity direction by splitting a light flux from a subject, which has been focused via the imaging optical system in the mounted lens unit, into two or more light fluxes by pupil splitting along the disparity direction and focusing each of the light fluxes obtained by the pupil splitting onto a corresponding photoelectric conversion element group and photoelectrically converting the light flux,
  storing a correction table storing a one-dimensional parameter for correcting one-dimensional shading occurring in the disparity direction in the output set of viewpoint images along the disparity direction to correspond to the acquired identification information,
  determining whether the correction table corresponding to the identification information of the mounted lens unit is stored, and
  correcting, when it is determined that the correction table corresponding to the identification information of the mounted lens unit is stored, the shading in the set of viewpoint images according to the correction table corresponding to the identification information of the mounted lens unit.

* * * * *